United States Patent [19]
Zarraga et al.

[11] Patent Number: 5,433,968
[45] Date of Patent: Jul. 18, 1995

[54] PROCESS FOR PRODUCING A SIMULATED MEAT PRODUCT

[75] Inventors: Meliton S. Zarraga, Tanauan, Philippines; Teh S. Guat, Singapore, Singapore

[73] Assignee: Nestec S.A., Vevey, Switzerland

[21] Appl. No.: 51,418

[22] Filed: Apr. 23, 1993

[51] Int. Cl.$^6$ .............................................. A23L 1/212
[52] U.S. Cl. .................... 426/574; 426/515; 426/546; 426/517; 426/519; 426/634; 426/656; 426/802
[58] Field of Search ............... 426/656, 245, 247, 249, 426/574, 634, 646, 653, 389, 512, 515, 516, 517, 518, 520, 519, 802

[56] References Cited

U.S. PATENT DOCUMENTS

| | | | |
|---|---|---|---|
| 3,968,269 | 7/1976 | Payne et al. | 426/646 |
| 4,038,432 | 7/1977 | Hildebolt et al. | 426/511 |
| 4,062,987 | 12/1977 | Hildebolt | 426/646 |
| 4,073,962 | 2/1978 | Spata et al. | 426/657 |
| 4,197,324 | 4/1980 | Ziminski et al. | 426/802 |
| 4,205,094 | 5/1980 | Baird et al. | 426/656 |
| 4,230,738 | 10/1980 | Shemer et al. | 426/656 |
| 4,376,134 | 3/1983 | Kumar | 426/656 |
| 4,495,205 | 1/1985 | Brander et al. | 426/656 |
| 4,551,351 | 11/1985 | Kawasaki et al. | 426/656 |
| 4,781,939 | 11/1988 | Martin et al. | 426/646 |
| 4,863,749 | 9/1989 | Yamada | 426/656 |
| 4,888,198 | 12/1989 | Beery et al. | 426/656 |
| 4,897,280 | 1/1990 | Ohtsu | 426/656 |
| 5,068,117 | 11/1991 | McCabe | 426/511 |
| 5,132,137 | 7/1992 | Reimann et al. | 426/513 |
| 5,206,050 | 4/1993 | Jennings | 426/656 |

OTHER PUBLICATIONS

Perry et al. 1973. Chemical Engineers' Handbook McGraw-Hill Co., New York. pp. 11-25 and 11-26.

*Primary Examiner*—Donald E. Czaja
*Assistant Examiner*—Anthony Weier

[57] ABSTRACT

A process of producing a texturized protein product having a layered meat-like texture and appearance in which only vegetable protein material, particularly soy flour, and water are used as ingredients. A dough-like slurry of soy flour and water is pumped into the gap between a fixed plate and a rapidly rotating plate in a high speed emulsion mill under conditions which rapidly heat the slurry to a temperature above 100° C. to rapidly texturize the protein. The hot slurry is pumped under positive pressure by centrifugal force from the emulsion mill directly into an elongated process tube in which the texturized protein slurry rapidly coagulates to form in the tube a continuous loaf having distinct parallel layers of soy protein bonded together which maintains its structure upon discharge from the tube. The continuous loaf is cut into pieces of a desired dimension with the pieces having a layered meat-like appearance and texture with the pieces retaining their shape and layered structure under commercial processing conditions including canning, retorting, drying, rehydration, freezing, thawing, and the like.

12 Claims, 1 Drawing Sheet

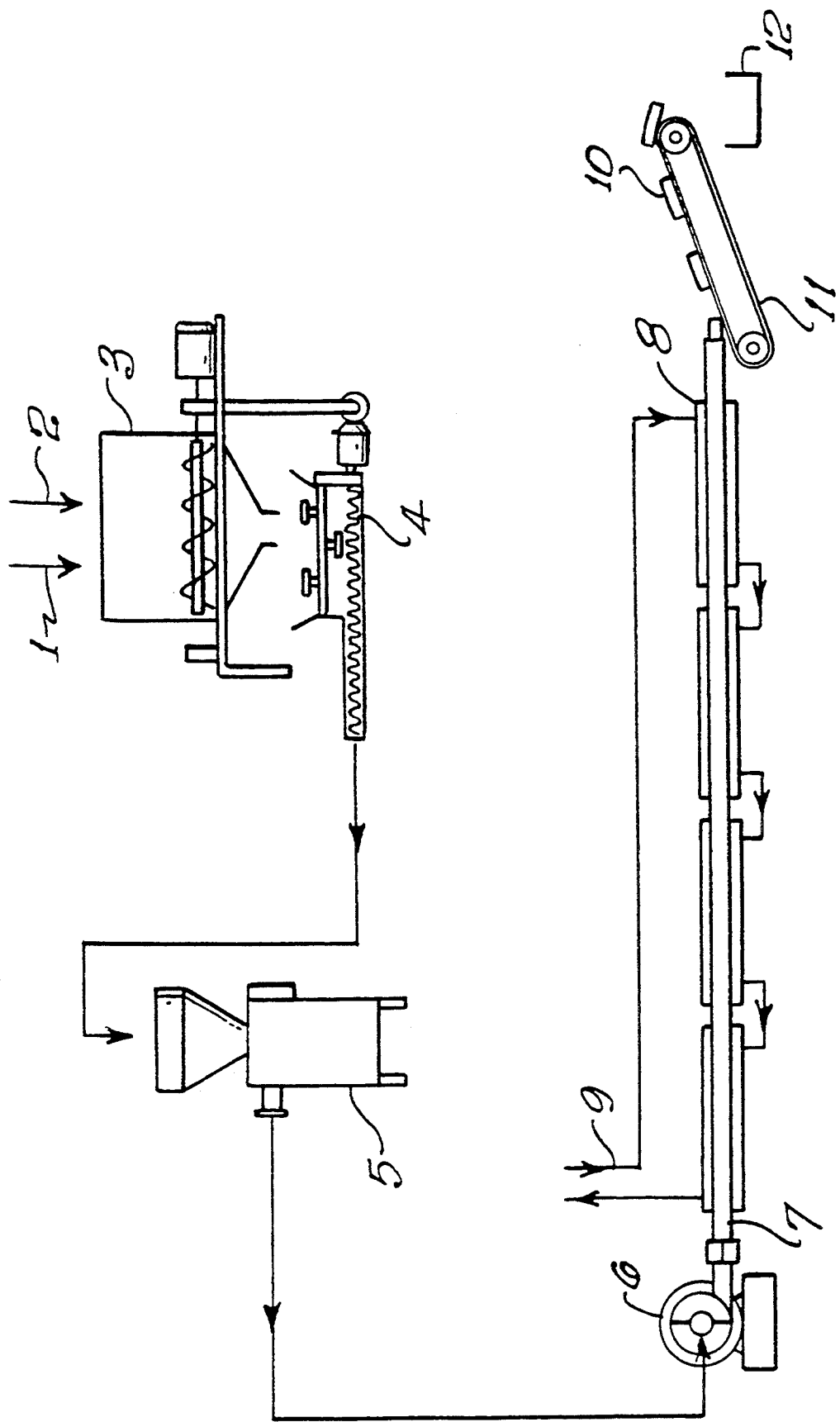

PROCESS FOR PRODUCING A SIMULATED MEAT PRODUCT

This invention relates to the production of simulated meat products from vegetable protein materials. More particularly, the invention relates to the production of texturized vegetable protein products having the layered appearance, texture and structure of chunks of striated natural meat tissue.

BACKGROUND OF THE INVENTION

In recent years a number of procedures have been proposed for producing meat analogs from vegetable protein materials, particularly soybeans. Typically such meat analogs are produced by passing an aqueous soy flour slurry through an extrusion cooker under predetermined conditions of moisture, time, temperature and pressure to form an expanded product, or by spinning an aqueous protein isolate slurry into fibers. Recently the use of steam as a texturizing agent has been proposed to produce texturized soy protein pieces intended to simulate meat products.

Such prior procedures have not been entirely satisfactory, however, since the texturized protein products produced lack the texture, appearance, physical structure and mouthfeel of natural meat. For example, meat analogs produced by steam texturizing soy protein have a texture and appearance similar to cooked ground beef rather than that of striated or skeletal muscle tissue. Prior procedures have been unable to impart to texturized protein products the texture, appearance and physical structure of natural meat pieces. This inability to produce texturized vegetable protein which simulate chunks of natural meat is a primary reason for the lack of widespread consumer acceptance of currently available meat analog products. In addition, prior procedures typically have employed such complex equipment and operations that production costs have made the resulting meat analog products commercially unattractive, despite the relatively inexpensive nature of the starting material.

SUMMARY OF THE INVENTION

The present invention provides a procedure for processing vegetable protein material, particularly soybean flour, to form a meat analog product having the layered or striated appearance, texture, and physical structure of natural meat chunks. The meat analog product of this invention is prepared by mixing a vegetable protein material, typically soy flour, with water to form a dough-like proteinaceous slurry. The slurry is pumped to a high speed emulsion mill of the type having a fixed plate and a rapidly rotating plate in the mill in which the slurry is forced through a gap between the fixed plate and the rapidly rotating plate, to rapidly heat the slurry to a temperature sufficient to rapidly texturize soy protein, typically to a temperature above about 100° C. In a preferred embodiment of the invention, the dough is heated above the texturizing temperature by mechanical energy by maintaining a narrow gap between the fixed plate and the rotating plate of the emulsion mill through which the dough-like slurry is passed.

The hot texturized proteinaceous slurry is pumped under positive pressure by centrifugal force from the emulsion mill into an elongated process tube in which the hot texturized soy protein forms juxtaposed layers of texturized protein extending across the width of the tube substantially perpendicular to the axial length of the tube. The hot pressurized soy protein quickly coagulates to set tire layers of texturized protein. The layered protein material is retained in the process tube until the layered protein material is sufficiently firm to be self-sustaining and the temperature and pressure of the protein material are reduced sufficiently to permit the protein material to be discharged from the tube into ambient conditions without disrupting the layered structure. In accordance with a preferred embodiment, the process tube is chilled, such as by the circulation of chilled water around the exterior of the process tube, so that the texturized product at the discharge end of the process tube is at a temperature and pressure of no more than about 100° C. and 2.5 bars.

The texturized protein product is discharged from the process tube as a continuous loaf having a layered, non-expanded structure containing distinct layers of texturized protein bonded together, with the layers being manually separable. The bonded layers of texturized protein are oriented in one direction, that is, they typically extend across the width of the loaf, generally perpendicular to the direction of flow of the proteinaceous mass through the process tube. Suitable cutting means such as a rotary cut-off knife, a knife grid, or the like, preferably is mounted at the discharge end of the process tube to cut the texturized protein loaf into pieces of a desired size.

The product thus obtained has a striated muscle-like structure formed of distinct layers of texturized soy protein bonded together, and resemble chunks of natural meat in appearance, texture and physical structure.

BRIEF DESCRIPTION OF THE DRAWING

The Drawing FIGURE is a schematic illustration of an embodiment of the procedure of the present invention for producing texturized vegetable protein product.

DETAILED DESCRIPTION

The layered, texturized meat analog product of this invention is prepared from vegetable protein sources, particularly soybeans. While soy flour is generally preferred as the vegetable protein source, it will be understood that proteinaceous materials derived from other vegetable sources may be used, alone or in combination with the soy flour, such as for example wheat, wheat gluten, corn, corn gluten, cottonseed, peanut, sesame, and the like. In preparing the texturized vegetable protein, soybeans, either whole beans or cracked and dehulled soybeans, which typically contain about 40%–45% protein, are comminuted in suitable comminution equipment such as a FITZ mill, CONDUX hammermill, COMITROL grinder, and the like, to provide finely divided soy flour, which typically has a total solids content in the range of 90%–95%. The soy flour is mixed with sufficient water to form a dough-like proteinaceous slurry having a total solids content in the range of 35% to 50%, preferably between 40% to 45%. Either tap water or hot water (e.g., 90° C.) may be used. When soy flour is used as the vegetable protein material, a food grade edible acid, either organic preferably is included in the proteinaceous slurry to provide the slurry with a pH of between about 4.6 and 5.4, usually between about 5.0 and 5.4. Suitable acids include, for example, acetic, lactic, hydrochloric, phosphoric, citric, tartaric and malic acids. A phosphoric acid solution is particularly suitable for reducing the pH of the proteinaceous slurry to the desired range without adversely affecting the taste of the texturized product produced from the acidified slurry.

The acidified soybean slurry is then pumped to a suitable holding tank. In a preferred embodiment the acidified dough-like slurry is deaerated such as by pumping it through a conventional vacuum stuffer to remove occluded air which could disrupt the product matrix and reduce its binding-capacity.

From the holding tank, or after deaeration (if used), the proteinaceous slurry is pumped to a high speed emulsion mill of the type having a fixed plate and high speed rotating plate, with a gap being maintained between the plates on the order of about 0.2 to 1 mm wide, preferably between 0.4 and 0.5 mm. As the dough-like slurry is forced through the gap in the high speed emulsifier, the slurry is rapidly heated by mechanical energy to a temperature above about 100° C. to effect rapid denaturation and texturization of the soy protein. Preferably the proteinaceous slurry is heated to a temperature in the range of 104° C. to 115° C. in the emulsion mill. Control of the slurry temperature can be affected by adjusting such factors as the slurry feed rate into the high speed emulsifier, the rotational speed of the emulsifier, the spacing between the plates of the high speed emulsifier, and the like, and can readily be determined by those skilled in the art. If desired, superheated steam may be injected into the emulsion mill to facilitate heating the viscous slurry to the desired temperature.

The hot proteinaceous slurry is pumped under positive pressure by centrifugal force from the high speed emulsion mill directly into an elongated process tube with the hot, pressurized (e.g., 3 to 9 bars) slurry being formed into distinct juxtaposed arcuate layers of texturized protein which extend substantially perpendicular to the axial length of the process tube. The texturized protein layers rapidly coagulate to form in the process tube a continuous proteinaceous loaf having distinct parallel arcuate layers of texturized soy protein bonded together. The bonded layers of texturized protein are oriented in one direction across the width of the loaf, generally perpendicular to the direction of flow of the proteinaceous loaf through the process tube. The residence time of the texturized protein in the elongated tube is not critical and may range from one or two minutes up to 10 minutes or more, typically between 3 to 6 minutes, provided the layered protein loaf is retained in the elongated tube until the texturized layers have set sufficiently to form a firm product which retains its shape and layered structure when discharged from the process tube.

In accordance with a preferred embodiment of the invention the elongated process tube is surrounded over substantially its entire length by a water jacket through which chilled water (e.g., 5° C.-12° C.) is circulated so that the texturized product at the discharge end of the tube is below the saturated steam temperature, with the temperature and pressure at the discharge end preferably being below about 100° C. and 2.5 bars respectively, to permit the layered texturized soy protein material to be discharged from the process tube into ambient conditions without disrupting the layered structure of the product.

The layered texturized proteinaceous loaf discharged from the process tube is cut into chunks or pieces of desired size. If desired, suitable cutting means such as a rotary cut-off knife, a knife grid and the like may be mounted at the discharge end of the tube to cut the texturized loaf into pieces of a desired size, which, optionally, may subsequently be cut into smaller size chunks.

The resulting product consists of chunks or pieces of well textured soy protein with each of the chunks having a plurality of distinct juxtaposed parallel layers of texturized soy protein bonded together and resembling natural meat chunks in appearance, texture and structure. The distinct layers of the chunks, while being bonded together, are manually separable similar to cutting along the grain of a chunk of meat. The texturized product typically has a solids content in the range of about 40% to 50%, which consists entirely or predominantly of soybean material. The chunks thus produced retain their layered structure when subjected to commercial canning and retorting procedures so that the chunks are particularly well suited for use as a meat analog.

The texturized chunks may be used as a meat analog as produced or, alternatively, the chunks may be dried or frozen prior to use. Texturized chunks which have been dried or frozen, when reconstituted or cooked for consumption maintain their distinct layered structure and their meat-like texture and appearance.

One embodiment of the invention now will be described with reference to the drawing. A premeasured amount of dehulled soy flour 1 and a predetermined amount of acidified water 2 are introduced into suitable mixing means 3, such as a ribbon blender, to form a dough-like slurry having a total solids content and pH within the desired range. The slurry thus formed is discharged into pump means 4, such as an open throat monopump having mixer paddle blades, and is pumped to vacuum stuffer 5 to deaerate the dough-like slurry. The slurry is continuously pumped from vacuum stuffer 5 into a high speed emulsion mill 6. The emulsion mill 6-includes a fixed plate and a very rapidly rotating plate, which rotates at a speed of about 1400 to 1600 rpm, with a gap of between about 0.2 mm to 1.0 mm in width being maintained between the plates. As the viscous slurry is pumped through the gap between the plates in the emulsifier 6, the slurry is rapidly heated to a temperature above about 100° C., preferably between 104° C. to 115° C. The hot slurry is pumped under positive pressure by centrifugal force from emulsion mill 6 directly into elongated process tube 7. Process tube 7 is surrounded over a substantial portion of its length by water jacket 8 through which chilled water 9 is circulated to facilitate reducing the temperature and pressure of the proteinaceous slurry in the tube so that the layered texture of the product is not disrupted as the product is discharged from the tube into ambient temperature and pressure conditions. Layered textured product discharged from elongated tube 7 is cut into chunks 10 of desired size by suitable cutting means (not shown) with chunks 10 being carried away on endless belt 11 to holding container 12 for further processing.

The dimensions of the elongated tube 7 are not critical. The tube should have a length sufficient so that the texturized slurry is retained in the tube until the texturized layers have set sufficiently to form a firm product, with the temperature and pressure of the texturized product being no more than about 100° C. and 2.5 bars at the discharge end of the tube. The diameter of the tube should be large enough to prevent clogging and small enough to facilitate maintenance of desired temperature and pressure conditions within the tube.

The following specific examples are intended to illustrate more fully the nature of the present invention. In the examples and elsewhere herein, parts and percentages are expressed by weight, unless otherwise indicated.

EXAMPLE I

A texturized soy protein meat analog having the appearance, texture and structure of natural meat pieces is produced by the following procedure.

A quantity of dehulled soybeans having a moisture content of about 8% and containing approximately 40% to 45% (dry basis) protein, is milled into flour in a CONDUX hammermill with a 2.0 mm sieve. One hundred kg of the dehulled soy flour is blended with from 110.0 to 120.0 kg of tap water which has previously been acidified by the addition of 1.30 kg of phosphoric acid (85%) in a ribbon blender for about 17 minutes to form a dough-like slurry having total solids content of about 41.5%, a pH of about 5.3 and a temperature of about 30.5° C. The slurry is discharged into an open throat monopump and pumped to a vacuum stuffer to deaerate the slurry.

After deaeration the viscous slurry is pumped to the high speed emulsion mill having a gap about 0.4 mm to 0.5 mm wide between a fixed plate and a rapidly rotating plate in the emulsion mill. As the slurry is passed through the gap it is heated almost instantaneously to a temperature of between about 108° C. to 114° C. by mechanical energy. At such a temperature, soy protein texturization proceeds very rapidly.

The hot slurry is pumped under positive pressure by centrifugal force from the emulsion mill directly into an elongated process tube having an internal diameter of about 10 cm and a length of 6.7 m. The flow rate of the proteinaceous slurry through the tube is controlled so that the slurry substantially fills the cross-sectional area of the tube over the length of the tube and provides the slurry with a residence time of about 4 to 5 minutes in the tube. Chilled water (5° C.) is circulated through a water jacket surrounding the tube over substantially its entire length to reduce the temperature and pressure of the slurry in the tube over the length of the tube. At the inlet end of the tube adjacent the emulsion mill, the temperature and pressure of the slurry are about 108° C. to 114° C. and 5 to 8 bars while at the discharge end of the tube the temperature and pressure are less than about 100° C. and 2.5 bars.

As a consequence of rapidly heating the proteinaceous slurry to a temperature at which soy protein is rapidly texturized, pumping the hot slurry under positive pressure by centrifugal force into the elongated process tube and maintaining the hot slurry under pressure in the tube until the texturized protein coagulates, the hot texturized soy protein slurry pumped into the process tube forms substantially parallel, juxtaposed layers of texturized protein which rapidly coagulate to provide a layered meat-like structure and appearance which is retained upon discharge from the tube.

An inline vertical wire cutter is installed at the discharge end of the process tube to cut the continuous texturized loaf into pieces about 25 to 30 cm long, and the pieces subsequently being cut with a TRIEF Dicer into chunks 12 mm × 12 mm × 12 mm in size.

The texturized product discharged from the process tube has a total solids content of about 40% to 50%, usually about 45% to 46% and a pH of between 5.3 and 5.4. The chunks have distinct parallel layers of texturized soy protein which are bonded together to provide the product with distinct evenly spaced striations and a layered meat-like appearance. The product has a chewy slightly rubbery bite and texture which simulates pieces of natural meat. The textured product has excellent integrity and retains its layered structure without disintegration when subjected to canning and retort procedures, drying and rehydration procedures, or freezing, thawing and cooking procedures.

The present invention is particularly directed to the production of texturized protein meat analogs in which only vegetable protein materials, particularly whole or dehulled soy flour, and acidified water are used as ingredients. It will be understood, however, that minor amounts of additives such as salts, fats, coloring, flavoring and/or animal protein materials may be included with the soy flour in the proteinaceous slurry which is texturized.

What is claimed is:

1. A process for producing a texturized vegetable protein product having the layered appearance of chunks of striated natural meat tissue, which consists essentially of
   mixing finely divided untextured vegetable protein material and water to form a slurry having a total solids content of about 35% to 50%,
   rapidly heating said slurry to a temperature above about 100° C. to effect rapid texturization of the protein,
   introducing the heated slurry at a temperature above about 100° C. under a positive pressure of about 3 to 9 bars pressure by centrifugal force into a process tube with the slurry substantially filling the cross-sectional area of the tube over the length of the tube whereby the texturized protein rapidly coagulates to form in the process tube a continuous protein loaf having distinct parallel arcuate layers of texturized protein bonded together, with the layers being oriented generally perpendicular to the axial length of the process tube,
   retaining the texturized coagulated protein in the process tube until the texturized layers have set sufficiently to form a firm product which retains its layered structure when discharged from the process tube,
   cooling the process tube whereby the temperature of the layered protein loaf is cooled to below the saturated steam temperature when the protein loaf exits the process tube,
   discharging the texturized protein from the process tube in the form of a continuous loaf having distinct, juxtaposed layers of texturized protein bonded together, and
   cutting the texturized protein loaf into pieces of a desired dimension, said pieces having a plurality of distinct layers of texturized vegetable protein bonded together.

2. The process defined in claim 1 in which the slurry consists essentially of soy flour having a protein content of about 40% to 50% as the vegetable protein material, and water.

3. The process defined in claim 2 in which the soy flour is mixed with water which has been acidified with sufficient edible acid to provide the slurry with a pH in the range of 4.6 to 5.4.

4. The process defined in claim 3 in which the slurry has a pH of between about 5.0 and 5.4.

5. The process defined in claim 2 in which the soy flour slurry is heated by pumping the slurry through a gap maintained between a fixed plate and a rapidly rotating plate in a high speed emulsion mill whereby the slurry is rapidly heated by mechanical energy and the heated slurry is pumped into the process tube from said emulsion mill.

6. The process defined in claim 5 in which the gap between the plates is about 0.2 to 1 mm in width.

7. The process defined in claim 5 in which the slurry is introduced into the process tube at a temperature in the range of about 104° C. to 115° C. and a pressure in the range of about 3 to 9 bars.

8. The process defined in claim 1 in which the texturized protein loaf discharged from the process tube has a total solids content of about 40% to 50%.

9. The process defined in claim 8 in which the texturized protein pieces are dried to a moisture content of about 5%.

10. The process defined in claim 8 in which the texturized protein pieces are frozen.

11. The process defined in claim 1 in which chilled water is circulated over substantially the entire length of the process tube to reduce the temperature and pressure of the layered protein loaf therein.

12. The process defined in claim 11 in which the temperature and pressure of the layered protein loaf do not exceed about 100° C. and 2.5 bars as the loaf exits the process tube.

* * * * *